United States Patent
Ando et al.

[19]

[11] Patent Number: 5,884,548
[45] Date of Patent: *Mar. 23, 1999

[54] PRESSURE DIFFERENTIAL OPERATED BRAKE BOOSTER

[75] Inventors: Hiromi Ando; Kiyoshi Shirahata; Mitsuhiro Endo; Atsuya Koshu, all of Yamanashi-ken, Japan

[73] Assignee: Tokico Ltd., Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 831,143

[22] Filed: Apr. 1, 1997

Related U.S. Application Data

[63] Continuation-in-part of Ser. No. 695,430, Aug. 12, 1996, abandoned.

[30] Foreign Application Priority Data

Sep. 30, 1996 [JP] Japan ................................... 8-278941
Jan. 27, 1997 [JP] Japan ................................... 9-027223

[51] Int. Cl.[6] ................................................... F15B 9/10
[52] U.S. Cl. ............................................................ 91/369.2
[58] Field of Search ................................ 91/369.2, 369.3, 91/376 R

[56] References Cited

U.S. PATENT DOCUMENTS

| | | | |
|---|---|---|---|
| 3,143,926 | 8/1964 | Stelzer | 91/369.2 |
| 3,548,595 | 12/1970 | Pech et al. | 91/369.3 |
| 4,319,455 | 3/1982 | Schubert | 91/369.2 |
| 5,699,713 | 12/1997 | Mortimer | 91/369.2 |

FOREIGN PATENT DOCUMENTS

| | | |
|---|---|---|
| 1 655 429 | 7/1967 | Germany . |
| 8-85442 | 4/1996 | Japan . |
| 95/01272 | 1/1995 | WIPO . |

*Primary Examiner*—F. Daniel Lopez
*Attorney, Agent, or Firm*—Wenderoth, Lind & Ponack, L.L.P.

[57] ABSTRACT

A brake booster includes a housing, a partition adapted to divide the interior of the housing into two chambers, and two diaphragms adapted to divide the two chambers into constant and variable pressure chambers. A control valve includes a valve body carried by the diaphragms, and a plunger slidably received in the valve body. The control valve is operatively connected to the variable pressure chambers to develop a pressure differential across the diaphragms to cause the diaphragms to move in response to actuation of an input rod. A reaction disk is disposed between an output rod and the valve body to transmit the reaction of movement of the output rod to the input rod. An adjusting mechanism is disposed between the plunger and the reaction disk and compressible so as to develop a greater degree of pressure differential when a force applied by the input rod exceeds a predetermined level. The reaction disk is caused to make contact with the contact disk and held out of contact with the spring and the plunger when the plunger is actuated.

20 Claims, 8 Drawing Sheets

PRESSURE DIFFERENTIAL OPERATED BRAKE BOOSTER

This is a continuation-in-part application of U.S. Patent application Ser. No. 695,430, filed on Aug. 12, 1996, now abandoned.

BACKGROUND OF THE INVENTION

The present invention relates to pressure differential operated boosters for use in automotive brake systems.

A conventional tandem servo booster typically includes a housing, a partition secured within the housing to divide the interior of the housing into front and rear chambers, and two diaphragms located on opposite sides of the partition and adapted to divide the interior of the front and rear chambers into front and rear constant and variable pressure chambers, respectively (see FIG. 5). The it partition and diaphragms are secured to a valve body. An H output rod is connected to the valve body through an elastomeric reaction disk. An input rod is coaxial with the output rod and is connected to a plunger which is slidably received in the valve body. The front and rear constant pressure chambers are permanently communicated with a vacuum source. Normally, the plunger is urged into its retracted position so as to hold all the four chambers in communication with the vacuum source. When the brake pedal is depressed, an input force is applied to the input rod to activate the plunger. The plunger is then unseated from a valve seat to interrupt vacuum communication between the constant pressure chambers and the variable pressure chambers and in turn, cause ambient air to enter the front and rear variable chambers. With the air in the variable pressure chambers, a pressure differential is developed across the front and rear diaphragms. This pressure differential acts on the diaphragms so as to develop a force which is carried into the valve body for distribution into the output rod. Except for the initial stage of braking, this output force linearly increases as the input force increases (see the line F in FIG. 6). It is, thus, necessary to heavily depress the brake pedal in the event that a larger braking force is required at the time of X emergency.

It is, therefore, an object of the present invention to provide a pressure differential operated brake booster which can readily produce a greater degree of braking force without the need to increase the force required to depress the brake pedal.

It is another object of the present invention to provide a pressure differential operated brake booster which enhances a "jump-in" effect at the time of emergency.

It is a further object of the present invention to provide a pressure differential operated brake booster which allows for ready and safe assembly of adjusting means within a valve body.

SUMMARY OF THE INVENTION

According to one aspect of the present invention, there is provided a pressure differential operated brake booster comprising a housing, movable wall means operatively arranged in the housing and adapted to divide the interior of the housing into a constant pressure chamber permanently communicated with a source of vacuum and a variable pressure chamber, control valve means including a valve body disposed within the housing and carried by the movable wall means, the valve body having first bore means constantly communicated with an ambient atmosphere or air, second bore means defined adjacent to the first bore means, and plunger means slidably disposed within the second bore means and having a bore, input means extending into the housing and adapted to actuate the plunger means, the control valve means being operatively connected to the variable pressure chamber to develop a pressure differential across the movable wall means to cause the movable wall means to move in response to actuation of the input means, output means responsive to the movable wall means, reaction means disposed between the output means and the valve body for transmitting reaction of movement of the output means to the input means, and adjusting means for adjusting the reaction of movement of the output means to the input means.

The adjusting means is arranged within the second bore means and compressible so as to provide a greater degree of pressure differential across the movable wall means when a force applied by the input means exceeds a predetermined level. The adjusting means comprises a contact disk normally spaced from the reaction means, and a compression spring disposed between the contact disk and the plunger means, and an adjusting member having one end secured to the contact disk and the other end slidably received within the bore of plunger means. The contact disk, the compression spring, and the plunger means are all slidable and arranged in series in the second bore means. The reaction means is caused to make contact with the contact disk and held out of contact with the compression spring and the plunger means when the plunger means is actuated by the input means.

The predetermined level or force is variable depending on the amount of which the adjusting member is inserted into said contact disk. Advantageously, the contact disk, the compression spring, and the spring seat are secured by the adjusting member to thereby form a single unit or subassembly.

According to another aspect of the present invention, there is provided a pressure differential operated booster comprising a housing, movable wall means operatively arranged in the housing and adapted to divide the interior of the housing into a constant pressure chamber and a variable pressure chamber, the constant pressure chamber being permanently communicated with a source of vacuum, control valve means including a valve body disposed within the housing and carried by the movable wall means, the valve body having first bore means constantly communicated with an ambient atmosphere or air, second bore means defined adjacent to the first bore means, and a plunger slidably disposed within the second bore means, input means extending into the housing and adapted to actuate the plunger, the control valve means being operatively connected to the variable pressure chamber to develop a pressure differential across the movable wall means to cause the movable wall means to move in response to actuation of the input means, output means responsive to the movable wall means, reaction means disposed between the output means and the valve body for transmitting reaction of movement of the output means to the input means, and adjusting means arranged within the second bore means for adjusting the reaction of movement of the output means to the input means.

The second bore means includes a large diameter bore defined adjacent to the first bore means, and a small diameter bore defined adjacent to the reaction means. The adjusting means comprises a contact member including a first cylindrical element normally spaced from the reaction means and slidably fit within the small diameter bore, a second cylindrical element disposed within the large diameter bore, and a flange secured between the first cylindrical element and the second cylindrical element and slidably fit within the large diameter bore, a spring seat having a hollow cylindrical element and a flange attached to the hollow cylindrical element and held in contact with said plunger, a spring disposed between said flange of the contact member and the flange of the spring seat and having a diameter greater than that of the first cylindrical element of the contact member, and an adjusting member having one end secured to the second cylindrical element and the other end disposed within the hollow cylindrical element of the spring seat.

Preferably, the spring is preloaded with a predetermined compressive force so that the spring is free from compression during a normal braking operation. A pressure differential developed across the movable wall means during the normal braking operation is increased when a force applied by the input means exceeds the predetermined compressive force during an emergency braking operation. A pressure differential developed during the emergency braking operation is 1.3 to 2.0 times greater than the pressure differential developed during the normal braking operation.

The pressure differential developed during the emergency braking operation is obtained when a vehicle deceleration is in the range from 0.3 G to 0.4 G. The pressure differential developed during the emergency braking operation continues until the contact disk and the spring seat are brought into contact with one another.

DESCRIPTION OF THE PREFERRED EMBODIMENTS

Figure 1:
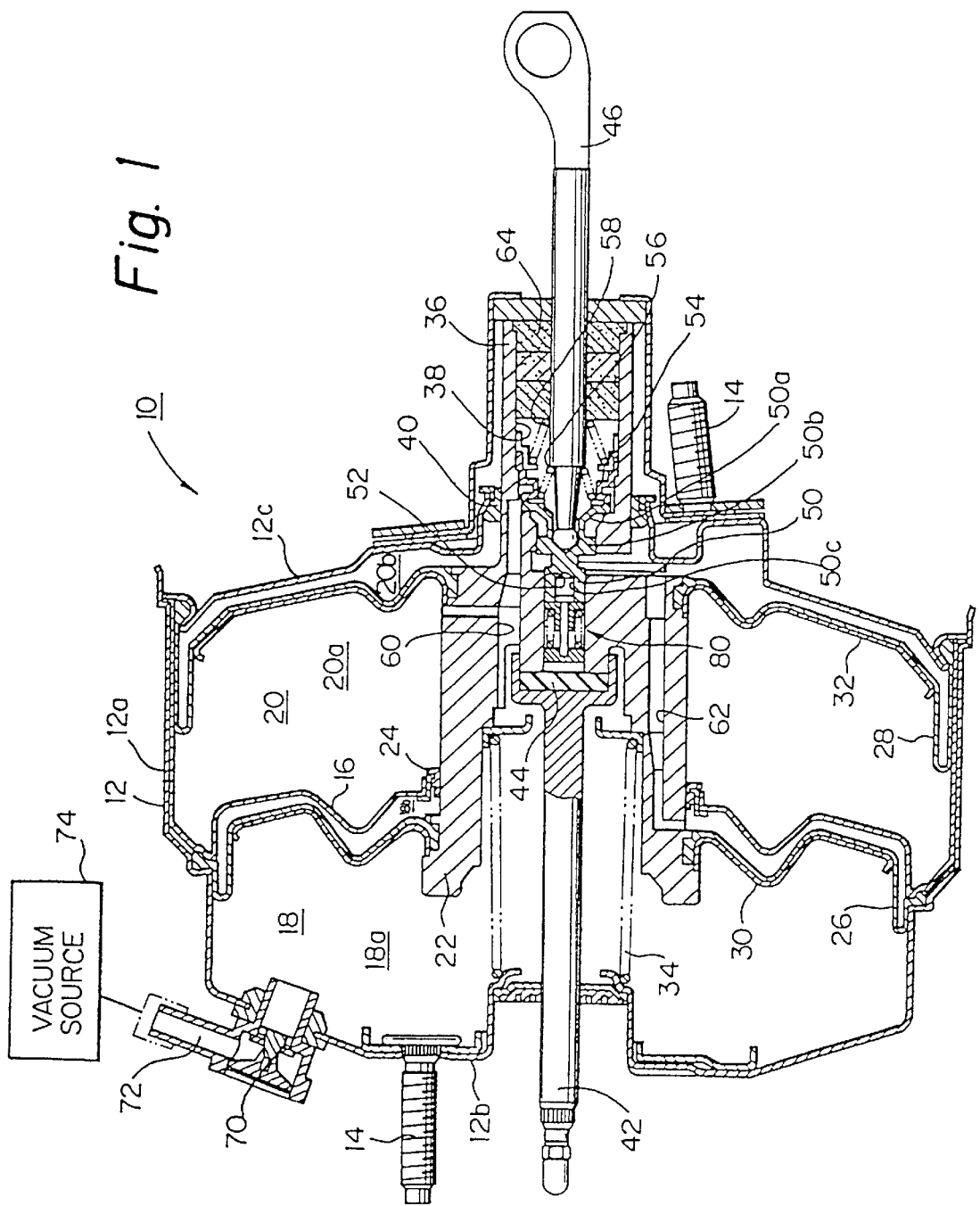
FIG. 1 is a sectional view of a tandem brake booster fabricated according to one embodiment of the present invention.
Figure 2:
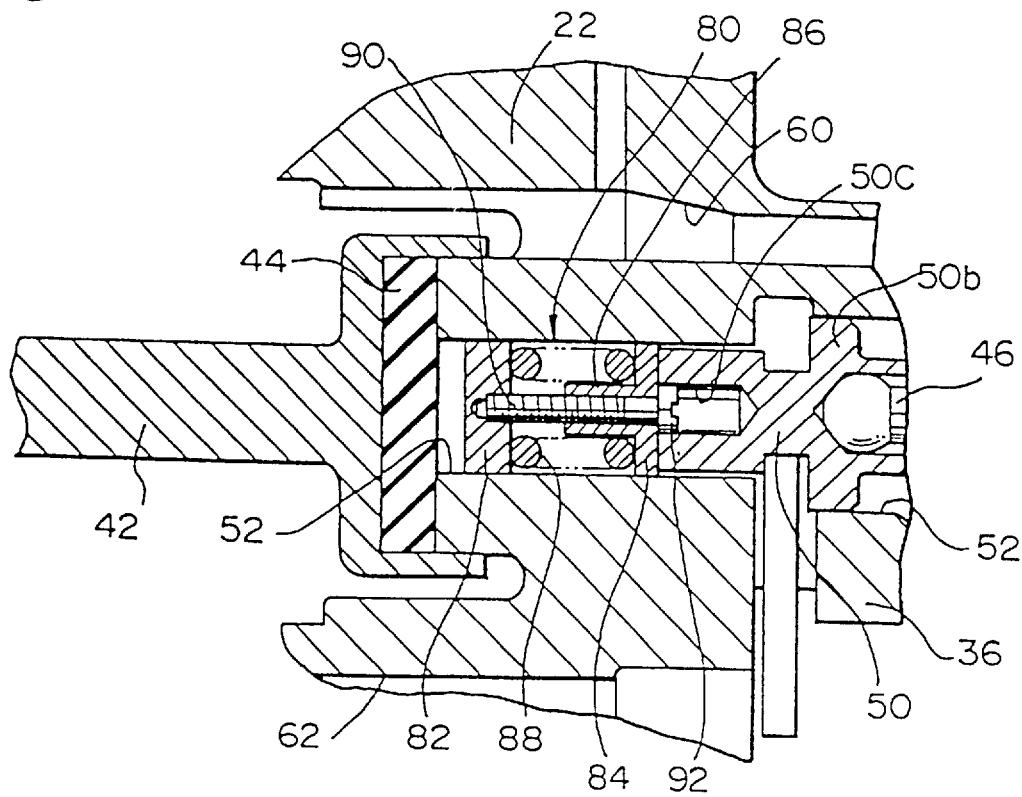
FIG. 2 is a sectional view, on an enlarged scale, of an adjusting mechanism included in the brake booster shown in FIG. 2.

Referring to FIGS. 1 and 2, there is illustrated a tandem brake booster 10 fabricated according to one embodiment of the present invention. The booster 10 includes a housing 12 mounted to the body (not shown) of a vehicle by a plurality of bolts 14. The housing 12 is composed of a generally cylindrical side wall 12a, and front and rear walls 12b, 12c secured to opposite ends of the side wall 12a, respectively. A generally annular partition 16 is secured within the housing 12 to divide the interior of the housing into a front chamber 18 and a rear chamber 20. A tubular member 22 is carried by an annular bearing seal 24 to allow for sliding motion between the tubular member 22 and the partition 16. Two diaphragms 26, 28 are located on opposite sides of the partition 16. The front diaphragm 26 has one end secured to the inner periphery of the housing 12 and the other end secured to one end of the tubular member 22. The front diaphragm 26 is adapted to divide the interior of the front chamber 18 into a front constant pressure chamber 18a and a front variable pressure chamber 18b. A generally annular backing plate or piston 30 is attached to one side of the front diaphragm 26 and has one end secured to the tubular member 22. Similarly, the rear diaphragm 28 has one end secured to the inner periphery of the housing 12 and the other end secured to the other end of the tubular member 22. The rear diaphragm 28 is adapted to divide the interior of the rear chamber 20 into a rear constant pressure chamber 20a and a rear variable pressure chamber 20b. A generally annular backing plate or piston 32 is attached to one side of the rear diaphragm 28 and has one end secured to the tubular member 22. The backing plates 30, 32 are normally biased to the right by a return spring 34 which is disposed between the front wall 12b of the housing 12 and the tubular member 22.

A generally cylindrical valve body 36 is integrally formed with the tubular member 22 and has a bore 38 within which a control valve means in the form of a poppet valve is received. The rear end of the valve body 36 extends slidably through the central opening of the rear housing wall 12c and is sealed to the rear wall 12c by an annular seal 40. An output rod 42 is positioned coaxially within the tubular member 22 and extends through the return spring 34. The output rod 42 has one end connected to the front end of the valve body 36 and the other end extending slidably through the central opening of the front housing wall 12b. As is conventional, the output rod 42 is connected to the master cylinder (not shown) of a vehicle braking system. An elastomeric reaction disk 44 is disposed between the output rod 42 and the valve body 36. An input rod 46 is coaxial with the output rod 42. One end of the input rod 46 is operably connected to a brake pedal (not shown) so as to control the control valve means. The other end of the input rod 46 extends slidably into the bore 38 of the valve body 36 and is engaged with a plunger 50. The plunger 50 is slidably received in a plunger bore 52 which is formed in the valve body 36 adjacent to the bore 38. The plunger 50 has a poppet member 50a which is seated on a valve seat 54 under the influence of a pair of springs 56, 58 when the booster 10 is in its released position as shown in FIG. 1. The plunger 50 also has a flange 50b received in the plunger bore 52.

The front and rear constant pressure chambers 18a, 20a are communicated through a passage 60. Also, the front and rear variable pressure chambers 18b, 20b are communicated through a passage 62. The bore 38 of the valve body 36 is at all times communicated with ambient atmosphere through a filter 64. The passage 62 also provides a fluid communication between the variable pressure chambers 18b, 20b and the bore 38 when the poppet member 50a is unseated from the valve seat 54 or when the brake pedal is depressed to urge the input rod 46 toward the reaction disk 44.

A check valve 70 is mounted to the housing 12 and is connected through a conduit 72 to a vacuum source 74 such as an engine manifold vacuum. The front and rear constant pressure chambers 18a, 20a are permanently communicated with the vacuum source 74. Normally, the plunger 50 is urged into its retracted position (or brake released position) under the action of the return spring 34. At this time, the control valve means is positioned to allow for fluid communication between the passages 60, 62 so that all the four chambers 18a, 18b, 20a, 20b are held in communication with the vacuum source 74. No pressure differential is developed across the diaphragms. When the brake pedal is depressed, an input force is applied to the input rod 46 to activate the control valve means. This causes the poppet member 50a to be unseated from the valve seat 54 so as to interrupt vacuum communication between the constant pressure chambers 18a, 20a and the variable pressure chambers 18b, 20b and instead, allow ambient air to enter the front and rear variable chambers 18b, 20b through the passage 62. With the air in the variable pressure chambers 18b, 20b, a pressure differential is developed across the front and rear diaphragms 26, 28 to cause the backing plates 30, 32 and diaphragms 26, 28 to move to the left. Thrust is then applied to the output rod 42 through the reaction disk 44 to thereby actuate the master cylinder. At this time, the reaction of movement of the output rod 42 is carried through the reaction disk 44 to the input rod 46.

As an important feature of the present invention, an adjusting mechanism 80 is operatively associated with the control valve means. As shown best in FIG. 2, the adjusting mechanism 80 is slidably mounted within the plunger bore 52 and disposed between the plunger 50 and the reaction disk 44. The adjusting mechanism 80 generally comprises a substantially circular contact disk 82 normally spaced from the reaction disk 44, an annular spring seat 84 constantly held in contact with the plunger 50 and having a sleeve 86, a compression spring 88 compressed between the contact disk 82 and the spring seat 84 by a predetermined force, and a bolt 90 extending through the sleeve 86 and having one end threaded into the contact disk 82. The bolt 90 has a head 92 at its other end. The plunger 50 has a blind bore 50c to slidably receive the head 92 of the bolt 90 when the reaction disk 52 is caused to urge the contact disk 82 toward the spring seat 84 against the action of the spring 88. The contact disk 82, the compression spring 88 and the spring seat 84 are axially arranged in series and secured by the bolt 90 to provide a single unit or subassembly.

In operation, the valve body 36 and the plunger 50 are urged to the right (see FIG. 1) when the booster 10 is in its brake released position. At this time, all the four chambers are communicated with the vacuum source 74. No thrust is applied to the output rod 42 in the absence of a pressure differential across the diaphragms 26, 28.

Figure 4:
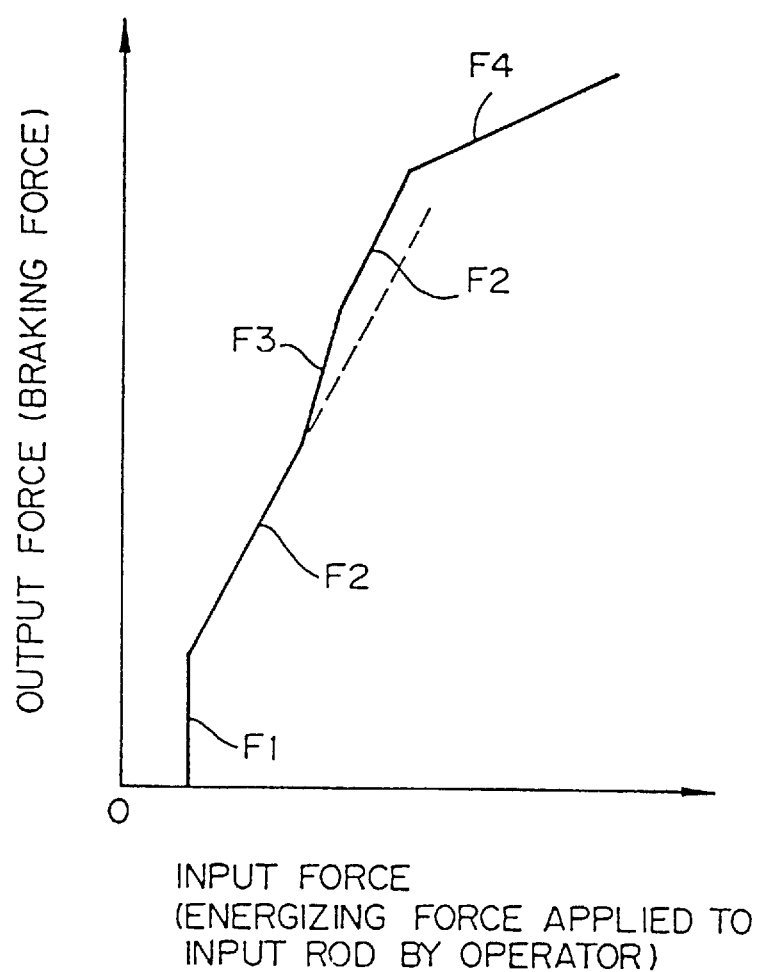
FIG. 4 is a graph showing input force v.s. output force in the brake booster shown in FIGS. 1 to 3
Figure 5:
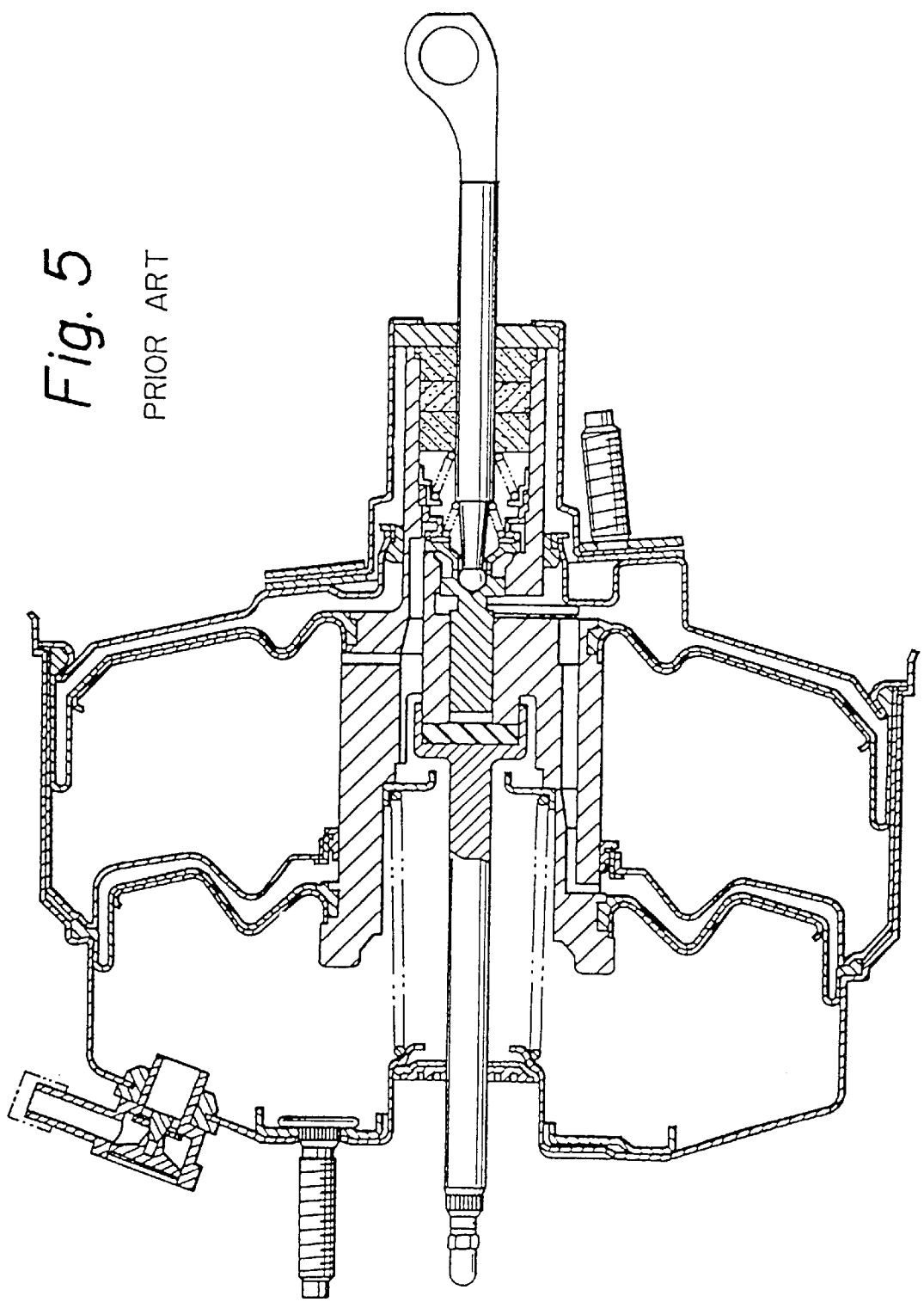
FIG. 5 is a sectional view of a tandem brake booster known in the art.
Figure 6:
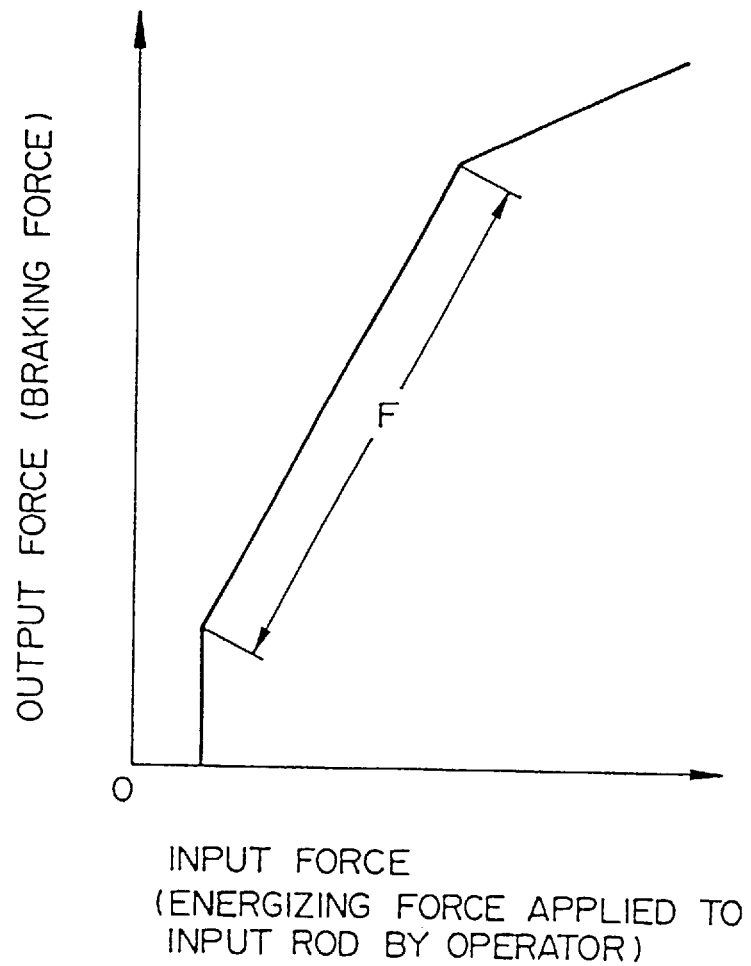
FIG. 6 is a graph showing input force v.s. output force in the brake booster shown in FIG. 5.

When the brake pedal (not shown) is initially depressed, the plunger 50 is caused to move slightly toward the reaction disk 44. As a result, the poppet member 50a is unseated from the valve seat 54 to allow ambient air to flow from the bore 38 to the variable pressure chambers 18b, 20b via the passage 62 as well as a passage (not shown) formed axially in the inner wall of the valve body 38 adjacent to the flange 50b of the plunger 50. With the air in the variable pressure chambers 18b, 20b, a pressure differential is developed across the diaphragms 26, 28. This pressure differential causes the backing plates 30, 32 and the tubular member 22 to be moved to the left in FIG. 1. This movement is then transmitted through the reaction disk 44 to the output rod 42. The output force dramatically increases although the input force remains substantially same. This change or phenomenon is commonly referred to in the trade as "jump-in effect" (see the line F1 in FIG. 4). At this time, a clearance still exists between the reaction disk 44 and the contact disk 82. Thus, no reaction is transmitted to the input rod 46.

When the brake pedal continues to be depressed, the output force or reaction gradually increases. As a result, the reaction disk 44 is compressed or enlarged to make contact with the contact disk 82. Part of the reaction is then transmitted to the input rod 46 (see the line F2 between the lines F1 and F3 in FIG. 4).

When the reaction force becomes greater than the compressive force of the spring 88, the contact disk 82 is urged toward the spring seat 84. In other words, the distance between the contact disk 82 and one end of the valve body 36 adjacent to the reaction disk 44 increases. Thus, the output force increases more significantly than the input force ("second jump-in effect"), as shown by the line F3 in FIG. 4.

As the input force increases, the contact disk 82 is moved toward the spring seat 84 until it is brought into contact with the free end of the sleeve 86. The distance between the contact disk 82 and the end of the valve body 38 no longer increases when the contact disk 82 is contacted with the sleeve 86. The relationship between the input force and the output force is then returned to the one shown by the line F2 between the lines F3 and F4 in FIG. 4.

When the input force further increases, the pressure within the variable pressure chambers 18b, 20b becomes atmospheric. No further pressure differential is created across the diaphragms 26, 28. Thus, the operator must supply the total energizing or mechanical force for moving the output rod and thus, pressurizing the fluid in the master cylinder (see the line F4 in FIG. 4).

When the brake pedal is released, the plunger 50 and the valve body 36 are returned to their initial position. This places all the four chambers in vacuum communication with the vacuum source 74. The valve body 38 and the plunger 50 are then returned to their retreated position under the action of the return spring.

Figure 3:
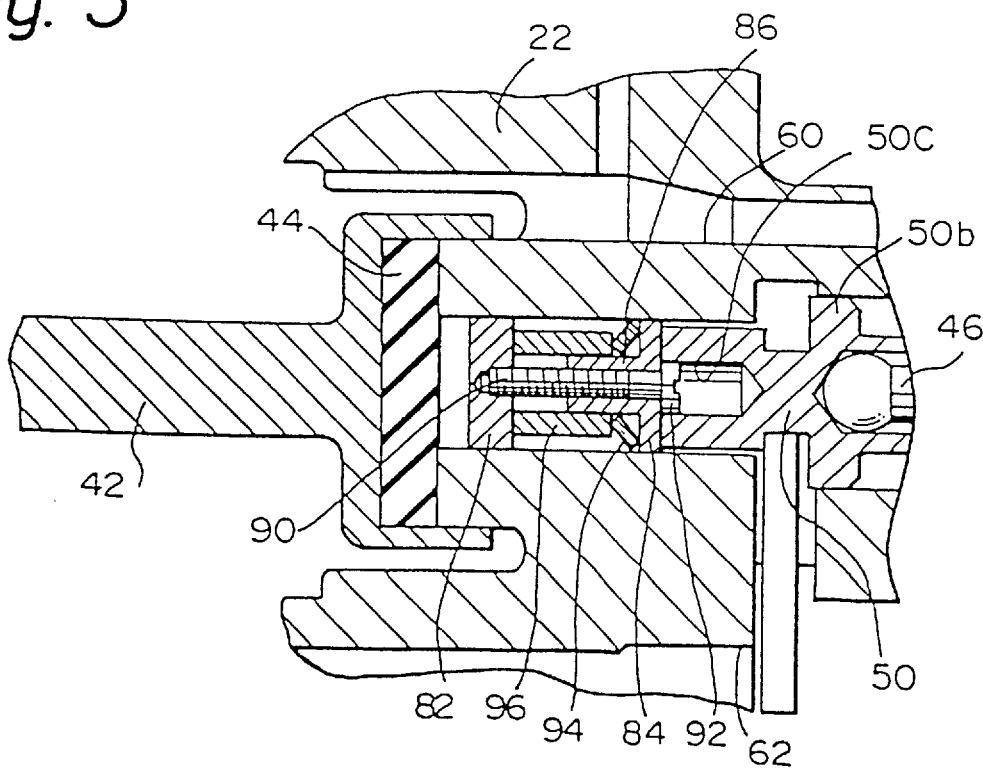
FIG. 3 is a view similar to FIG. 2, but showing a modified form of the adjusting mechanism.

Referring to FIG. 3 wherein like reference numerals are used to designate like or corresponding parts shown in FIGS. 1 and 2, the compression spring may be replaced by a belleville spring 94. In such a case, the belleville spring 94 should be retained between the spring seat 84 and a sleeve 96. This sleeve 96 extends from the contact disk 82 toward the spring seat 84 and is partly fit around the sleeve 86.

In order to enhance the "second jump-in effect (see F3 in FIG. 4)", it is necessary to decrease spring constant, that is, to increase the number of turns or the diameter of a spring. However, an increase in the number of turns of the spring results in a corresponding increase in the axial length of the valve body and thus, the entire booster. It is therefore preferable to increase the diameter of a spring as shown in FIG. 7.

Figure 7:
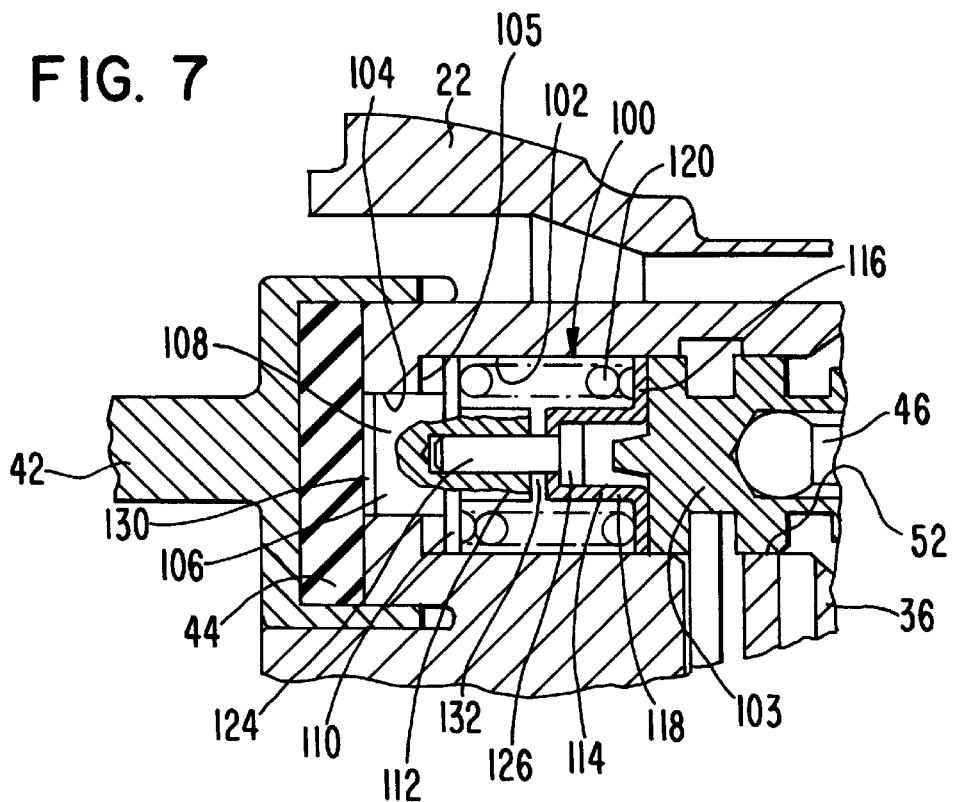
FIG. 7 is a view similar to FIG. 2, but showing a modified form of the adjusting mechanism.

FIG. 7 illustrates a modified form of the adjusting mechanism. Specifically, an adjusting mechanism 100 is slidably mounted within the valve body 36 as in the previous embodiments. Like parts are given like reference numerals and will not be described in detail. A large diameter bore 102 is formed in the valve body 36 adjacent to the plunger bore 52 in which a plunger 103 is disposed. A small diameter bore 104 is also defined in the valve body 36 adjacent to the large diameter bore 102. A step or shoulder 105 is formed between the large diameter bore 102 and the small diameter bore 104. Illustratively, the adjusting mechanism 100 comprises a contact member 106 to receive the reaction of movement of the output rod 42 through the reaction disk 44. The contact member 106 is composed of a cylindrical element 108 slidably fit within the small diameter bore 104 and normally spaced from the reaction disk 44, a flange 110 secured to the cylindrical element 108 and slidably fit within the large diameter bore 102, and a cylindrical element 112 secured to the flange 110. A spring seat 114 is slidably disposed within the large diameter bore 102. The spring seat 114 is composed of an annular flange 116 slidably fit within the large diameter bore 102 and held in contact with one end of the plunger 103, and a hollow cylindrical element 118 extending from the flange 116 toward the cylindrical element 112. The cylindrical element 118 has an opening 119. A compression spring 120 is disposed within the large diameter bore 102 between the flange 110 and the flange 116. A bolt 122 is adapted to adjust the compressive force of the spring 120. As shown better in FIG. 8, the bolt 122 includes a shank 124, and a head 126 secured to one end of the shank 124 and slidably disposed within the hollow cylindrical element 118. The other end of the shank 124 is forced into the cylindrical element 112 of the contact member 106. The shank extends through the opening 119 of the cylindrical element 119. Conveniently, the compressive force of the spring 120 is readily adjustable in response to the amount of insertion of the shank 124 into the cylindrical element 112. Alternatively, threads 128 may be formed in one end of the bolt 122 and threaded into the cylindrical element 112 as shown in FIG. 9. With the adjusting mechanism 100 thus constructed, the spring 120 has a diameter greater than that of the cylindrical element 106. Thus, the spring 120 has a spring constant less than that of the spring 88.

As in the previous embodiments, the contact member 106, the compression spring 120, and the spring seat 114 are axially arranged in series and secured by the bolt 122 to thereby form a single unit or subassembly. The contact member 106, the compression spring 120 and the spring seat 114 as a subassembly are inserted from one end of the large diameter bore 102 adjacent to the plunger bore 52. At this time, the flange 110 of the contact member 106 acts as a stopper to prevent the subassembly from being released from the other end of the bores.

Figure 8:
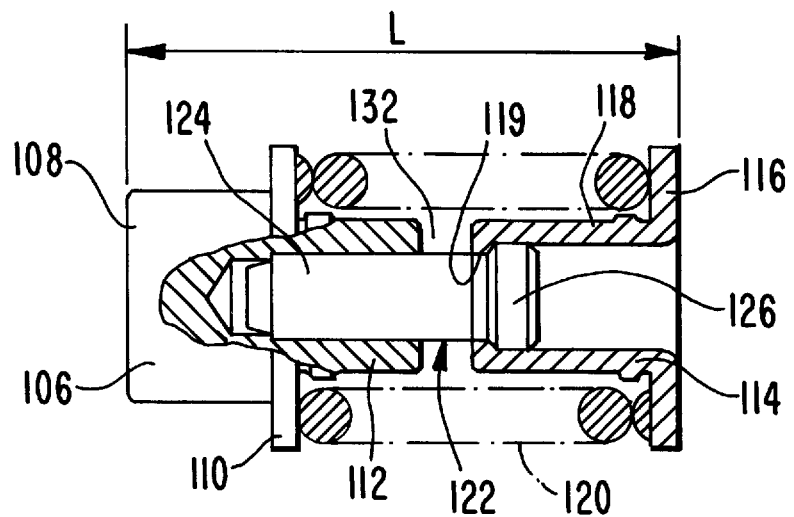
FIG. 8 is an enlarged view of the adjusting mechanism shown in FIG. 7.
Figure 9:
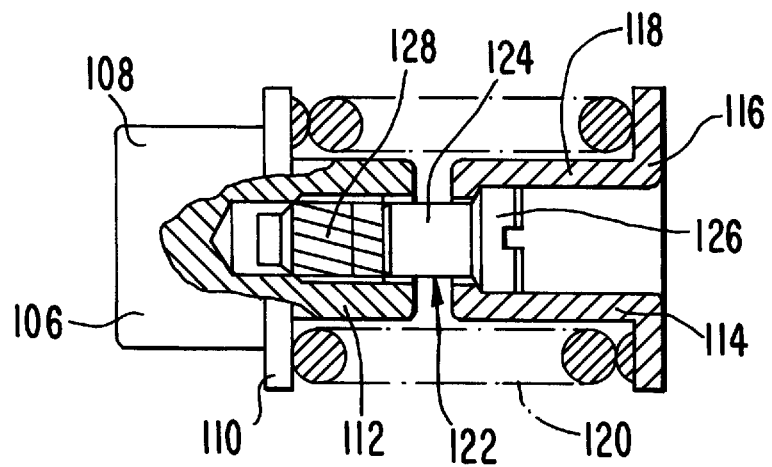
FIG. 9 is a view similar to FIG. 8, but showing another modified form of the adjusting mechanism.

As shown in FIG. 8, the subassembly has a length L when the booster is in its released position. As the length L is slightly less than the distance between the reaction disk 44 and the flange 116 of the spring seat 114, a clearance 130 is defined between the reaction disk 44 and the cylindrical element 108 of the contact member 106. Also, the bolt 122 is forced or threaded into the cylindrical element 110 of the contact member 106 to the extent that a clearance 132 is left between the cylindrical element 112 and the cylindrical element 118. The head 126 of the bolt 124 is also free to move within the hollow cylindrical element 114. With this arrangement, the contact member 106 and the spring seat 114 can be moved relative to one another against the action of the compression spring 120 by an amount corresponding to the extent of the clearance 132.

Operation of the adjusting mechanism 100 is substantially identical to that of the adjusting mechanism 80 except that the spring 120 better provides the second jump-in effect than the spring 88 since the former has a spring constant less than that of the latter as described earlier.

Figure 10:
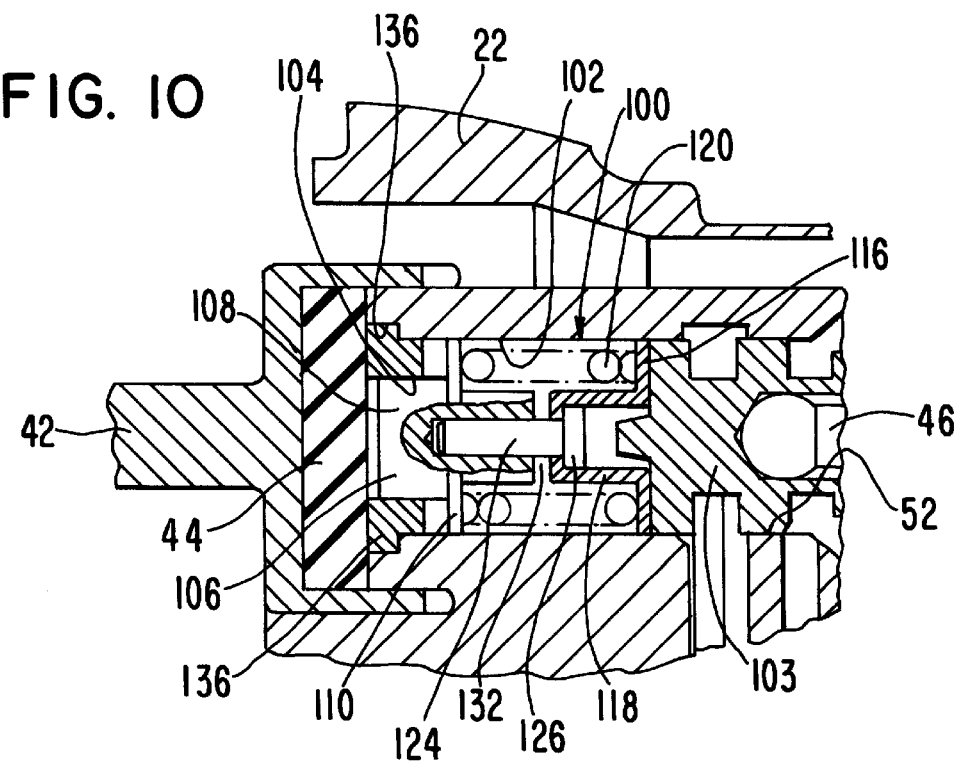
FIG. 10 is a view similar to FIG. 2, but showing a modified form of the adjusting mechanism.

Referring to FIG. 10, the small diameter bore 104 may be formed by the use of a spacer 136. The spacer 136 is secured within one end of the valve body 36 adjacent to the reaction disk 44. The valve body 36 may preferably have a recess 138 to receive the spacer 136. Advantageously, where there is a need to change the diameter of the contact member, it is only necessary to change the spacer rather than the entire valve body.

Figure 11:
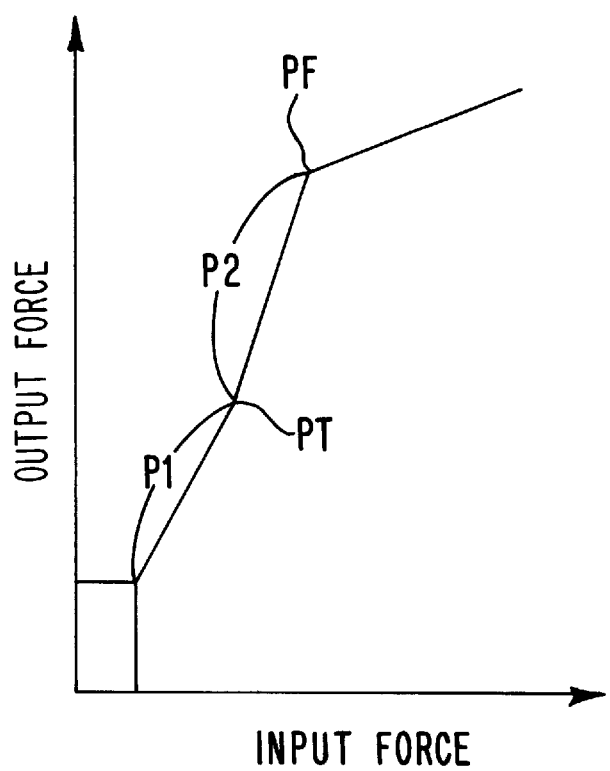
FIG. 11 is a graph showing the relationship between an input force applied by an input rod and an output force applied to an output rod.

Preferably, the spring 120 is preloaded with a predetermined compressive force so that the spring 120 is free from compression during a normal braking operation (see P1 in FIG. 11). When an input force which is greater than the predetermined force is applied to the input rod, typically during an emergency braking operation, the spring 120 becomes compressed so as to develop a greater degree of pressure differential across the diaphragms 26, 28 (see P2 in FIG. 11). Preferably, the spring 120 has a spring constant so that a pressure differential P2 developed across the diaphragms 26, 28 during the emergency braking operation is 1.3 to 2.0 times greater than a pressure differential P1 developed during the normal braking operation. Also, the spring 120 is preferably subject to compression where a vehicle deceleration is in the range from 0.3 G to 0.4 G. In this way, a lesser degree of force is required to depress the brake pedal during the emergency braking operation. As shown in FIG. 11, the pressure differential P2 continues until a full load point PF where the cylindrical element 112 of the contact member 106 and the cylindrical element 118 of the spring seat 114 are brought into contact with one another. Accordingly, there will be no drop in the braking force during the emergency braking operation.

Although the present invention has been described with respect to its preferred embodiments, it is not limited thereto. Various modifications and changes may be made without departing from the spirit and scope of the invention. For example, the invention may be applied to a single servo booster rather than the tandem servo booster. Also, the reaction of movement of the output rod may be carried through a reaction lever in lieu of the reaction disk.

What is claimed is:

1. A pressure differential operated booster for a vehicle braking system, comprising:

a housing having an interior;

movable wall means operatively arranged in said housing and adapted to divide the interior of said housing into a constant pressure chamber and a variable pressure chamber, said constant pressure chamber being permanently communicated with a source of vacuum;

control valve means including a valve body disposed within said housing and carried by said movable wall means, said valve body having first bore means constantly communicated with an ambient atmosphere, second bore means defined adjacent to said first bore means, and plunger means movably disposed within said second bore means;

input means extending into said housing and adapted to actuate said plunger means;

said control valve means being operatively connected to aid variable pressure chamber so as to develop a pressure differential across said movable wall means in response to actuation of said input means to thereby cause movement of said movable wall means, output means responsive to said movable wall means;

reaction means disposed between said output means and said valve body for transmitting reaction from said output means to said input means; and adjusting means for adjusting the reaction from said output means to said input means, said adjusting means being arranged within said second bore means and compressible so as to provide a greater degree of pressure differential across said movable wall means when a force applied by said input means exceeds a predetermined level, said adjusting means including a contact disk spaced from said reaction means when said input means is in a non-operative state, and a compression spring disposed between said contact disk and said plunger means, said contact disk, said compression spring, and said plunger means being axially arranged in series within said second bore means, and said contact disk being freely movable toward said plunger means without interruption by said valve body.

2. A pressure differential operated booster according to claim 1, wherein said adjusting means includes an adjusting member having one end secured to said contact disk and the other end movably supported by said plunger means, said predetermined level being variable depending on the amount of which said adjusting member is inserted into said contact disk.

3. A pressure differential operated booster according to claim 2, further comprising a spring seat operatively associated with said plunger means and having a first sleeve extending toward said contact disk, said contact disk having a second sleeve extending toward said spring seat and fit around said first sleeve of said spring seat, said compression spring being a belleville spring disposed between said first sleeve of said spring seat and said second sleeve of said contact disk.

4. A pressure differential operated booster according to claim 1, further comprising a spring seat positioned between said compression spring and said plunger means, said contact disk, said compression spring and said spring seat being assembled as a single unit.

5. A pressure differential operated booster according to claim 1, wherein said compression spring is preloaded with a predetermined compressive force so that said compression spring may not be compressed during a normal braking operation.

6. A pressure differential operated booster according to claim 5, wherein a boost ratio (output force/input force) is increased when the normal braking operation is changed to an emergency braking operation wherein a force applied by said input means exceeds said predetermined compressive force.

7. A pressure differential operated booster according to claim 6, wherein the boost ratio is 1.3 to 2.0 times greater when the normal braking operation is changed to the emergency braking operation than during the normal braking operation.

8. A pressure differential operated booster according claim 7, wherein 0.3 to 0.4 G is obtained when the normal braking operation is changed to the emergency braking operation.

9. A pressure differential operated booster for a vehicle braking system, comprising:

a housing having an interior;

movable wall means operatively arranged in said housing and adapted to divide the interior of said housing into a constant pressure chamber and a variable pressure chamber, said constant pressure chamber being permanently communicated with a source of vacuum;

control valve means including a valve body disposed within said housing and carried by said movable wall means, said valve body having first bore means constantly communicated with an ambient atmosphere, second bore means defined adjacent to said first bore means, and a plunger movably disposed within said second bore means;

input means extending into said housing and adapted to actuate said plunger;

said control valve means being operatively connected to said variable pressure chamber so as to develop a pressure differential across said movable wall means in response to actuation of said input means to thereby cause movement of said movable wall means, output means responsive to said movable wall means;

reaction means disposed between said output means and said valve body for transmitting reaction from said output means to said input moans; and adjusting means for adjusting the reaction from said output means to said input means;

said second bore means including a large diameter bore defined adjacent to said first bore means, and a small diameter bore defined adjacent to said reaction means, said adjusting means comprising a contact member including a first cylindrical element spaced from said reaction means when said input means is in a non-operative state and slidably fit within said small diameter bore, a second cylindrical element disposed within said large diameter bore, and a flange secured between said first cylindrical element and said second cylindrical element and slidably fit within said large diameter bore, a spring seat having a hollow cylindrical element and a flange attached to said hollow cylindrical element and held in contact with said plunger, a spring disposed between said flange of said contact member and said flange of said spring seat and having a diameter greater than that of said first cylindrical element of said contact member, and an adjusting member having one end secured to said second cylindrical element and the other end disposed within said hollow cylindrical element of said spring seat.

10. A pressure differential operated booster according to claim 9, wherein said compression spring is preloaded with a predetermined compressive force so that said compression spring may not be compressed during a normal braking operation.

11. A pressure differential operated booster according to claim 10, wherein a boost ratio (output force/input force) is increased when the normal braking operation is changed to an emergency braking operation wherein a force applied by said input Deans exceeds said predetermined compressive force.

12. A pressure differential operated booster according to claim 11, wherein the boost ratio is 1.3 to 2.0 times greater when the normal braking operation is changed to the emergency raking operation than during the normal braking operation.

13. A pressure differential operated booster according to claim 12, wherein 0.3 to 0.4 G is obtained when the normal braking operation is changed to the emergency braking operation.

14. A pressure differential operated booster according to claim 9, further comprising an annular spacer disposed within said second bore means, so that said small diameter bore is formed to receive said first cylindrical element of said contact member.

15. A pressure differential operated booster for a vehicle braking system, comprising:

a housing having an interior;

movable wall means movably disposed within said housing and adapted to divide the interior of said housing into a constant pressure chamber and a variable pressure chamber, said constant pressure chamber being permanently communicated with a source of first pressure;

a movable body supported by said movable wall means and having a first part extending out of said housing and a second part extending within said housing, said movable body including one means, said bore means extending axially through said movable body and including a first bore constantly communicated with a source of second pressure and a second bore defined adjacent to said first bore, said second pressure being greater than said first pressure;

an input rod extending into said housing through said first bore;

a plunger slidably disposed within said second bore, said plunger having one end and the other end, said input rod being connected to said one and of said plunger;

means for developing a pressure differential between said constant pressure chamber and said variable pressure chamber, said means for developing being operable to allow communication between said variable pressure chamber and said first bore in response to actuation of said input rod so as to develop a pressure differential across said movable wall means to thereby cause movement of said movable wall means;

an output rod responsive to said movable body when said movable wall means is displaced within said housing;

a reaction disk disposed between said output rod and said movable body for transmitting reaction from said output rod to said input rod; and adjusting means for adjusting the reaction from said output rod to said input rod, said adjusting means being arranged within said second bore and disposed between said plunger and said reaction disk, said adjusting means being compressible so as to provide a greater degree of pressure differential across said movable wall means when a force applied by said input rod exceeds a predetermined level, said second bore having one part within which said plunger is disposed, and the other part within which said adjusting means is disposed, said other part including a large diameter bore defined adjacent to said plunger, and a small diameter bore defined between said large diameter bore and said reaction disk, said adjusting means comprising a contact member and a compression spring, said contact member having one end located within said large diameter bore and having a diameter greater than that of said small diameter bore, and the other and slidably fit within said small diameter bore, said other end of said contact member being spaced away from said reaction disk when said input rod is in a non-operative state, said compression spring being disposed within said large diameter bore and extending between said one end of said contact member and said plunger, said compression spring having a diameter greater than that of said small diameter bore.

16. A pressure differential operated booster for a vehicle braking system, comprising:

a housing having an interior;

a movable wall movably disposed within said housing and adapted to divide the interior of said housing into a constant pressure chamber and a variable pressure chamber, said constant pressure chamber being permanently communicated with a source of vacuum;

a valve body disposed within said housing and supported by said movable wall, said valve body including bore means extending axially therethrough;

an input rod having one end extending out of said bore means and connected to a brake pedal, and the other end extending within said bore means;

a plunger having one end and the other end, said one end of said plunger being connected to said other end of said input rod, said bore means including a first bore within which said plunger is slidably moved in response to actuation of said input rod, and a second bore defined adjacent to said first bore;

means for permitting communication between said variable pressure chamber and an ambient atmosphere and interrupting communication between said variable pressure chamber and said source of vacuum to thereby develop a pressure differential across said movable wall and for permitting communication between said variable pressure chamber and said source of vacuum and interrupting communication between said variable pressure chamber and said ambient atmosphere to thereby eliminate said pressure differential across said movable wall;

an output rod responsive to said valve body;

a reaction disk disposed between said output rod and said valve body for transmitting reaction from said output rod to said input rod; and adjusting means for adjusting the reaction from said output rod to said input rod, said adjusting moans being arranged within said second bore and disposed between said reaction disk and said other end of said plunger, said adjusting means being compressible so as to provide a greater degree of pressure differential across said movable wall when a force applied by said input rod exceeds a predetermined level, said adjusting means including a contact disk arranged in confronting relation to said reaction disk and axially movably disposed in said second bore, said contact disk being freely slidable toward said plunger without interruption by said valve body, and a compression spring extending axially between said contact disk and said plunger, said compression spring having a preload so that said compression spring may not be compressed when a reactive force developed initially as said output rod is moved in response to actuation of said input rod causes the reaction disk to make contact with said contact disk and becomes compressed when said reactive force exceeds said predetermined level.

17. A pressure differential operated booster according to claim 16, wherein said compression spring allows said contact disk to move relative to said plunger.

18. A pressure differential operated booster according to claim 17, wherein said reactive force transmitted from said output rod to said input rod decreases after said predetermined level exceeds said preload of said compression spring.

19. A pressure differential operated booster for a vehicle braking system, comprising:

a housing having an interior;

movable wall means movably disposed within said housing and adapted to divide the interior of said housing into a constant pressure chamber permanently communicated with a source of vacuum and a variable pressure chamber;

a movable body supported by said movable wall means and movable with said movable wall means within said housing, said movable body including a plunger bore;

an input rod having one end connected to brake pedal and the other end extending into said movable body;

a plunger connected to said other end of said input rod and slidably disposed within said plunger bore;

a poppet valve arranged within said movable body and operated to allow said variable pressure chamber to be selectively communicated with said source of vacuum and an ambient atmosphere having a higher pressure than said source of vacuum;

an output rod responsive to said movable body, said movable body being moved when said variable pressure chamber is communicated with the ambient atmosphere to thereby develop a pressure differential across said movable wall means;

a reaction disk disposed between said output rod and said movable body and operated to transmit a part of reactive force from said output rod to said input rod through said plunger; and adjusting means arranged between said reaction disk and said plunger for adjusting the reactive force, said adjusting means including a contact disk arranged in confronting relation to said reaction disk and spaced away from said reaction disk when said input rod is in a non-operative state, said reaction disk being brought into contact with said contact disk when said reaction disk is deformed under said the reactive force, and a spring disposed between said contact disk and said plunger and having a given preload, said contact disk being axially supported only by said plunger and said input rod when said part of reactive force is applied from said output rod to said contact disk through said reaction disk, said spring being operable to prevent said contact disk from being moved toward said plunger until said part of reactive force exceeds said preload of said spring and allow said contact disk to be moved toward said plunger after said part of reactive force exceeds said preload of said spring.

20. A pressure differential operated booster for a vehicle braking system, comprising:

a housing having an interior;

movable wall means movably disposed within said housing and adapted to divide the interior of said housing into a constant pressure chamber permanently communicated with a source of vacuum and variable pressure chamber;

a movable body supported by said movable wall means and movable with said movable wall means within said housing, said movable body including a plunger bore;

an input rod having one end connected to a brake pedal and the other end extending into said movable body;

a plunger connected to said other end of said input rod and slidably disposed within said plunger bore;

means for allowing said variable pressure chamber to be selectively communicated with said source of vacuum and an ambient atmosphere, said ambient atomosphere having a higher pressure than said source of vacuum;

an output rod responsive to said movable body, said movable body being moved when said variable pressure chamber is communicated with the ambient atmosphere to thereby develop a pressure differential across said movable wall means;

a reaction disk disposed between said output rod and said movable body and operated to transmit a part of reactive force from said output rod to said plunger and said input rod; and adjusting means arranged between said reaction disk and said plunger for adjusting the reactive force, said adjusting means including a contact disk disposed in confronting relation to said reaction disk with a clearance between a surface on which said contact disk is subjected to said reactive force and a surface on which said movable body and said reaction disk are contacted with each other when said reactive force is absent, and a compression spring disposed between said contact disk and said plunger and having a given preload, said compression spring being operable to limit position of said contact disk relative to said plunger so as to adjust said clearance, said clearance being increased when said reactive force exceeds said preload of said compress spring.

* * * * *